(12) United States Patent
Brundridge et al.

(10) Patent No.: US 8,880,766 B2
(45) Date of Patent: Nov. 4, 2014

(54) METHODS AND SYSTEMS FOR REMOVAL OF INFORMATION HANDLING RESOURCES IN A SHARED INPUT/OUTPUT INFRASTRUCTURE

(75) Inventors: Michael A. Brundridge, Georgetown, TX (US); Babu Chandrasekhar, Round Rock, TX (US); Michael Wilmington, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 315 days.

(21) Appl. No.: 13/440,257

(22) Filed: Apr. 5, 2012

(65) Prior Publication Data

US 2013/0268709 A1 Oct. 10, 2013

(51) Int. Cl.
*G06F 13/00* (2006.01)
*G06F 13/40* (2006.01)

(52) U.S. Cl.
CPC .................................. *G06F 13/4081* (2013.01)
USPC ......................................................... 710/304

(58) Field of Classification Search
CPC ... G06F 9/4413; G06F 1/1632; H05K 7/1488; H05K 11/3055
USPC ................................................. 710/301–304
See application file for complete search history.

(56) References Cited

U.S. PATENT DOCUMENTS

| | | | | |
|---|---|---|---|---|
| 5,220,668 A * | 6/1993 | Bullis | ........................... | 718/102 |
| 5,596,728 A * | 1/1997 | Belmont | ........................ | 710/304 |
| 5,664,118 A * | 9/1997 | Nishigaki et al. | ............. | 710/304 |
| 5,696,970 A * | 12/1997 | Sandage et al. | ................ | 719/324 |
| 6,026,354 A * | 2/2000 | Singh et al. | ..................... | 702/186 |
| 6,249,826 B1 * | 6/2001 | Parry et al. | ........................ | 710/19 |
| 7,103,761 B2 * | 9/2006 | Larson et al. | ....................... | 713/1 |
| 7,577,812 B2 * | 8/2009 | Fujibayashi et al. | ........... | 711/170 |
| 7,873,866 B2 * | 1/2011 | Nonaka et al. | ................ | 714/6.32 |
| 8,024,586 B2 * | 9/2011 | Hansen | ......................... | 713/300 |
| 8,099,634 B2 * | 1/2012 | Benhase et al. | ................. | 714/44 |
| 8,350,711 B2 * | 1/2013 | Berke et al. | .................... | 340/584 |
| 8,424,010 B2 * | 4/2013 | Stegaru et al. | ................. | 718/104 |
| 8,538,019 B2 * | 9/2013 | Pham et al. | .................... | 380/247 |
| 8,572,294 B2 * | 10/2013 | Chisholm | ........................ | 710/10 |
| 8,694,810 B2 * | 4/2014 | Ahluwalia et al. | ............. | 713/320 |
| 2004/0003078 A1 * | 1/2004 | Todd et al. | ..................... | 709/224 |
| 2012/0166387 A1 * | 6/2012 | Nakamura | .................... | 707/609 |

\* cited by examiner

*Primary Examiner* — Paul R Myers
(74) *Attorney, Agent, or Firm* — Jackson Walker L.L.P.

(57) ABSTRACT

One or more chassis management controllers may be configured to receive a user indication of a user desire to physically remove a modular information handling resource from a chassis, determine whether the modular information handling resource is shared or nonshared with respect to modular information handling systems present in the chassis, determine whether the modular information handling systems associated with the modular information handling resource are powered on, receive at least one response to one query to the user regarding at least one user preference regarding removal of the modular information handling resource, and determine if the information handling resource may be safely removed based at least on: the determinations of whether the information handling system resource is shared or nonshared and whether the modular information handling systems present in the chassis and associated with the modular information handling resource are powered on, and the at least one response.

20 Claims, 3 Drawing Sheets

METHODS AND SYSTEMS FOR REMOVAL OF INFORMATION HANDLING RESOURCES IN A SHARED INPUT/OUTPUT INFRASTRUCTURE

TECHNICAL FIELD

The present disclosure relates in general to information handling systems, and more particularly to providing user selection of associations between information handling resources and information handling systems in an integrated chassis.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Existing server architectures either provide a single monolithic server capable of running one operating system and input/output (I/O) resources at a time, or bulky blade server chassis providing multiple servers and I/O control modules in a single chassis. A system chassis with multiple information handling systems with various peripheral and input/output capabilities common to the chassis as a whole may provide advantages, as it allows a blade server chassis in a small form factor, thereby providing a blade server chassis with a size comparable to the size of a monolithic server. Implementation of a system chassis with multiple information handling systems with various peripheral and input/output capabilities common to the chassis as a whole presents numerous challenges.

SUMMARY

In accordance with the teachings of the present disclosure, the disadvantages and problems associated with removal of information handling resources in a shared input/output infrastructure have been reduced or eliminated.

In accordance with some embodiments of the present disclosure, a system may include a chassis configured to receive a plurality of modular information handling systems and a plurality of modular information handling resources, and one or more chassis management controllers housed in the chassis. The one or more chassis management controllers may be configured to receive a user indication of a user desire to physically remove a modular information handling resource from the chassis, determine whether the modular information handling resource is shared or nonshared with respect to modular information handling systems present in the chassis, determine whether the modular information handling systems present in the chassis and associated with the modular information handling resource are powered on, receive at least one response to one query to the user regarding at least one user preference regarding removal of the modular information handling resource, determine if the information handling resource may be safely removed from the chassis based at least on: (i) the determination of whether the information handling system resource is shared or nonshared, (ii) the determination of whether the modular information handling systems present in the chassis and associated with the modular information handling resource are powered on, and (iii) the at least one response.

In accordance with these and other embodiments of the present disclosure, a method may include receiving a user indication of a user desire to physically remove a modular information handling resource from a chassis configured to receive a plurality of modular information handling systems and a plurality of modular information handling resources. The method may also include determining whether the modular information handling resource is shared or nonshared with respect to modular information handling systems present in the chassis. The method may additionally include determining whether the modular information handling systems present in the chassis and associated with the modular information handling resource are powered on. The method may further include receiving at least one response to one query to the user regarding at least one user preference regarding removal of the modular information handling resource. The method may also include determining if the information handling resource may be safely removed from the chassis based at least on: (i) the determination of whether the information handling system resource is shared or nonshared, (ii) the determination of whether the modular information handling systems present in the chassis and associated with the modular information handling resource are powered on, and (iii) the at least one response.

Technical advantages of the present disclosure will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
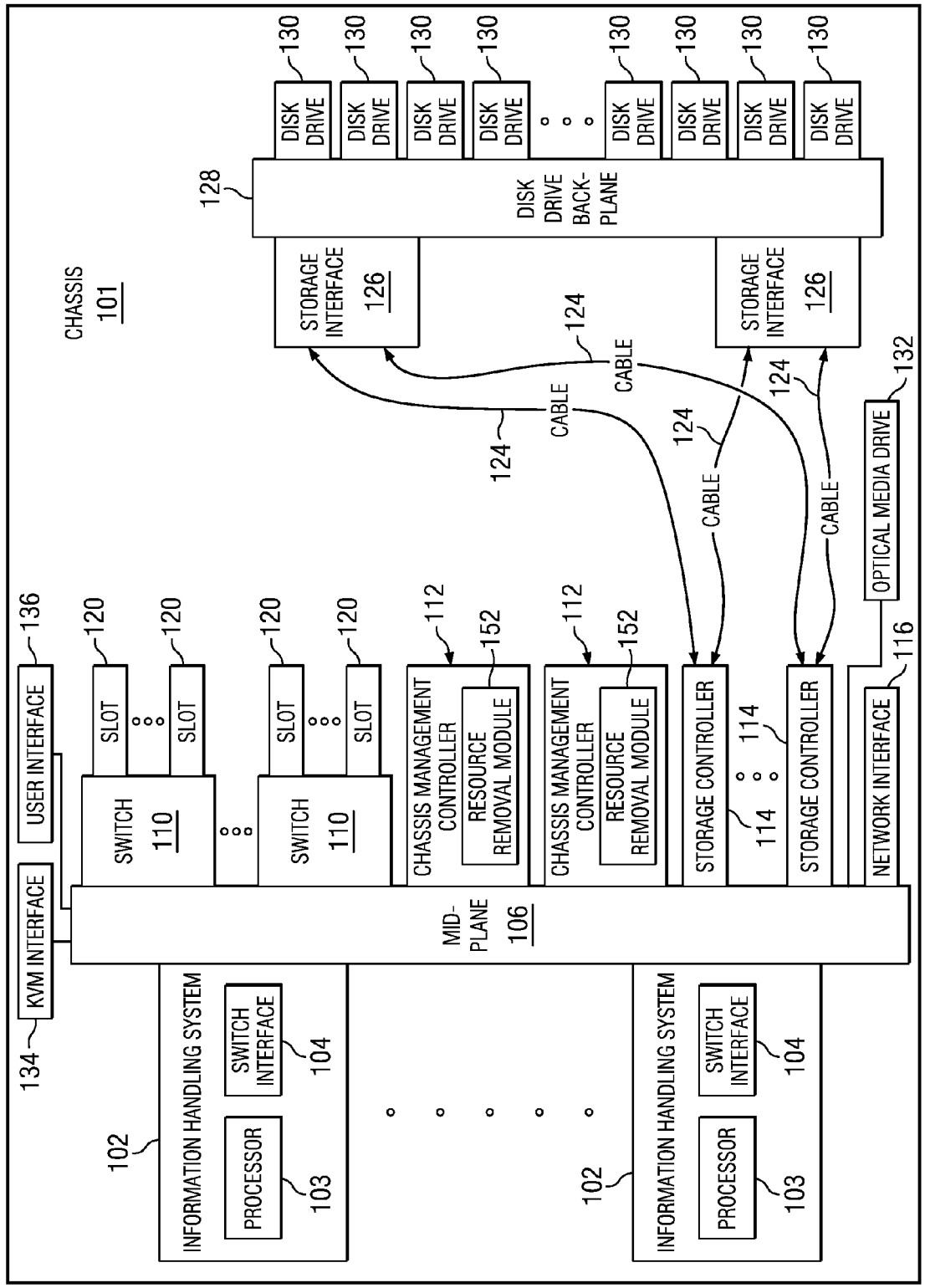
FIG. 1 illustrates a block diagram of an example system chassis with multiple information handling systems and with various peripheral and input/output capabilities common to the chassis as a whole, in accordance with certain embodiments of the present disclosure.
Figure 2A:
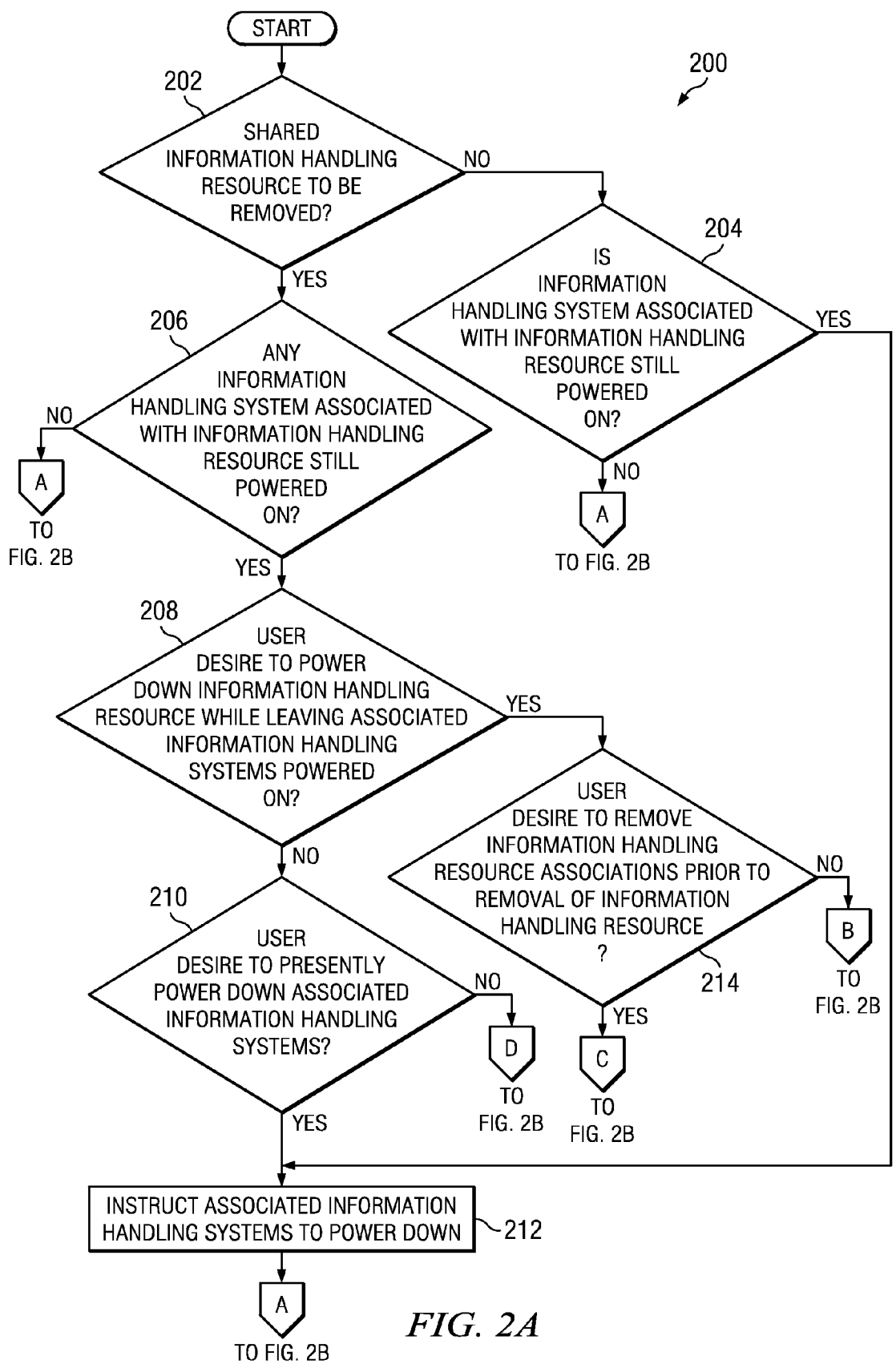
FIGS. 2A and 2B illustrate a flow chart of an example method for facilitating safe removal of an information handling resource, in accordance with the present disclosure.
Figure 2B:
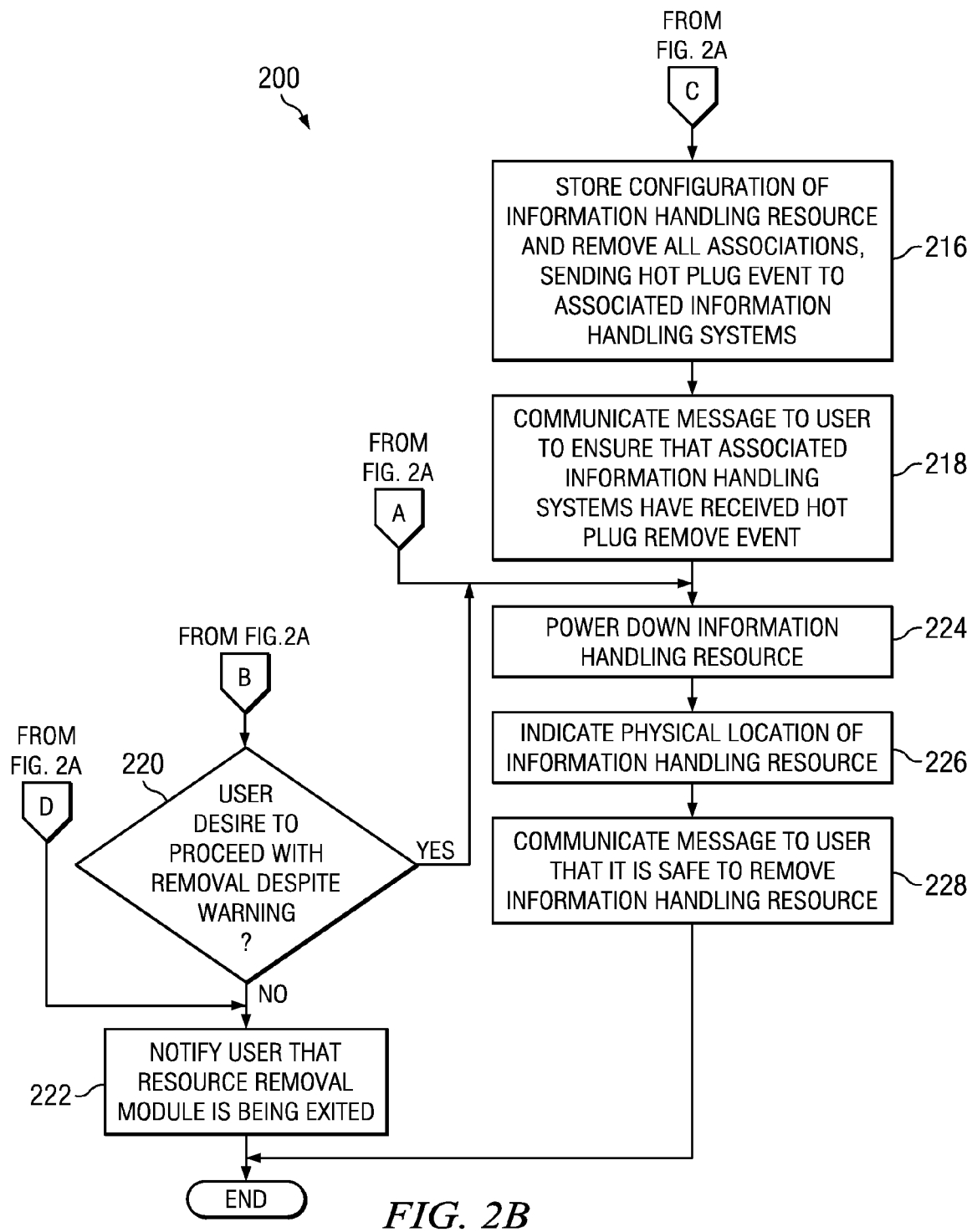

Preferred embodiments and their advantages are best understood by reference to FIGS. 1, 2A, and 2B, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, information handling resources may broadly refer to any component system, device or apparatus of an information handling system, including without limitation processors, busses, memories, input-output devices and/or interfaces, storage resources, network interfaces, motherboards, electro-mechanical devices (e.g., fans), displays, and power supplies.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing.

Information handling systems often use an array of physical storage resources (e.g., disk drives), such as a Redundant Array of Independent Disks (RAID), for example, for storing information. Arrays of physical storage resources typically utilize multiple disks to perform input and output operations and can be structured to provide redundancy which may increase fault tolerance. Other advantages of arrays of physical storage resources may be increased data integrity, throughput and/or capacity. In operation, one or more physical storage resources disposed in an array of physical storage resources may appear to an operating system as a single logical storage unit or "logical unit." Implementations of physical storage resource arrays can range from a few physical storage resources disposed in a chassis, to hundreds of physical storage resources disposed in one or more separate storage enclosures.

FIG. 1 illustrates a block diagram of an example system 100 having a chassis 101 with multiple information handling systems 102 and with various peripheral and input/output capabilities common to chassis 101 as a whole, in accordance with certain embodiments of the present disclosure. As depicted in FIG. 1, system 100 may comprise a chassis 101 including a plurality of information handling systems 102, a mid-plane 106, one or more switches 110, one or more chassis management controllers 112, a network interface 116, one or more slots 120, one or more cables 124, one or more storage interfaces 126, a disk drive backplane 128, a plurality of disk drives 130, an optical media drive 132, a keyboard-video-mouse (KVM) interface 134, and a user interface 136.

An information handling system 102 may generally be operable to receive data from and/or communicate data to one or more disk drives 130 and/or other information handling resources of chassis 101 via mid-plane 106. In certain embodiments, an information handling system 102 may be a server. In such embodiments, an information handling system may comprise a blade server having modular physical design. In these and other embodiments, an information handling system 102 may comprise an M class server. As depicted in FIG. 1, an information handling system 102 may include a processor 103 and one or more switch interfaces 104 communicatively coupled to the processor 103.

A processor 103 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in a memory, a hard drive 130, and/or another component of system 100.

A switch interface 104 may comprise any system, device, or apparatus configured to provide an interface between its associated information handling system 102 and switches 110. In some embodiments, switches 110 may comprise Peripheral Component Interconnect Express (PCIe) switches, in which case a switch interface 104 may comprise a mezzanine card configured to create a PCIe-compliant interface between its associated information handling system 102 and switches 110. In other embodiments, a switch interface 104 may comprise an interposer. Use of switch interfaces 104 in information handling systems 102 may allow for minimal changes to be made to traditional servers (e.g., M class servers) while supporting the overall system architecture disclosed herein. Although FIG. 1 depicts an implementation including a single switch interface 104 per information handling system 102, in some embodiments each information handling system 102 may include a plurality of switch interfaces 102 for redundancy, high availability, and/or other reasons.

Mid-plane 106 may comprise any system, device, or apparatus configured to interconnect modular information handling systems 102 with information handling resources of chassis 101. Accordingly, mid-plane 106 may include slots and/or connectors configured to receive information handling systems 102, switches 110, chassis management controllers 112, storage controllers 114, network interface 116, optical media drive 132, KVM interface 134, user interface 136, and/or other information handling resources. In one embodiment, mid-plane 106 may include a single board configured to interconnect modular information handling systems 102 with information handling resources. In another embodiment, mid-plane 106 may include multiple boards configured to interconnect modular information handling systems 102 with information handling resources. In yet another embodiment, mid-plane 106 may include cabling configured to interconnect modular information handling systems 102 with information handling resources.

A switch 110 may comprise any system, device, or apparatus configured to couple information handling systems 102 to storage controllers 114 (e.g., via mid-plane 106) and slots 120 and perform switching between information handling systems 102 and various information handling resources of system 100, including storage controllers 114 and slots 120.

In certain embodiments, a switch 110 may comprise a PCIe switch. In other embodiments, a switch may comprise a generalized PC bus switch, an Infiniband switch, or other suitable switch. As shown in FIG. 1, chassis 101 may include a plurality of switches 110. In such embodiments, switches 110 may operate in a redundant mode for shared devices (e.g., storage controllers 114 and/or devices coupled to slots 120) and in non-redundant mode for non-shared/zoned devices. As used herein, shared devices may refer to those which may be visible to more than one information handling system 102, while non-shared devices may refer to those which are visible to only a single information handling system 102.

A chassis management controller 112 may be any system, device, or apparatus configured to facilitate management and/or control of system 100, its information handling systems 102, and/or one or more of its component its component information handling resources. A chassis management controller 102 may be configured to issue commands and/or other signals to manage and/or control information handling system 102 and/or information handling resources of system 100. A chassis management controller 112 may comprise a microprocessor, microcontroller, digital signal processor (DSP), application specific integrated circuit (ASIC), field programmable gate array (FPGA), erasable programmable read-only memory (EPROM), or any combination thereof. As shown in FIG. 1, a chassis management controller 112 may be coupled to mid-plane 106. Also as shown in FIG. 1, system 100 may include a plurality of chassis management controllers 112, and in such embodiments, chassis management controllers 112 may be configured as redundant. In some embodiments, a chassis management controller 112 may provide a user interface and high level controls for management of switches 110, including configuring assignments of individual information handling systems 102 to non-shared information handling resources of system 100. In these and other embodiments, a chassis management controller may define configurations of the storage subsystem (e.g., storage controllers 114, storage interfaces 126, disk drives 130, etc.) of system 100. For example, a chassis management controller may provide physical function configuration and status information that would normally occur at the driver level in traditional server implementations. Examples of physical functions include disk drive discovery and status, RAID configuration and logical volume mapping.

In addition or alternatively, a chassis management controller 112 may also provide a management console for user/administrator access to these functions. For example, a chassis management controller 112 may implement Intelligent Platform Management Interface (IPMI) or another suitable management protocol permitting a user to remotely access a chassis management controller 112 to configure system 100 and its various information handling resources. In such embodiments, a chassis management controller 112 may interface with a network interface separate from network interface 116, thus allowing for "out-of-band" control of 100, such that communications to and from chassis management controller 112 are communicated via a management channel physically isolated from an "in band" communication channel with network interface 116. Thus, for example, if a failure occurs in system 100 that prevents an administrator from interfacing with system 100 via network interface 116 and/or user interface 136 (e.g., operating system failure, power failure, etc.), the administrator may still be able to monitor and/or manage system 100 (e.g., to diagnose problems that may have caused failure) via a chassis management controller 112. In the same or alternative embodiments, chassis management controller 112 may allow an administrator to remotely manage one or parameters associated with operation of system 100 and its various information handling resources (e.g., power usage, processor allocation, memory allocation, security privileges, etc.). Although FIG. 1 depicts chassis as having two chassis management controllers 112, chassis 101 may include any suitable number chassis management controllers 112.

As shown in FIG. 1, a chassis management controller 112 may include a resource removal module 152. Resource removal module 152 may comprise any system, device, or apparatus configured to facilitate safe physical removal of an information handling resource (e.g., a device coupled to a slot 120) from chassis 101, as described in greater detail herein. In certain embodiments, resource removal module 152 may be configured to perform all of a portion of method 200, described in greater detail below with respect to FIGS. 2A and 2B. Resource removal module 152 may be implemented in hardware, software (e.g., a program of instructions embodied in computer-readable media), firmware, or a combination thereof.

A storage controller 114 may and include any system, apparatus, or device operable to manage the communication of data between one or more of information handling systems 102 and one or more of disk drives 130. In certain embodiments, a storage controller 114 may provide functionality including, without limitation, disk aggregation and redundancy (e.g., RAID), input/output (I/O) routing, and error detection and recovery. As shown in FIG. 1, a storage controller 114 may coupled to a connector on mid-plane 106. Also as shown in FIG. 1, system 100 may include a plurality of storage controllers 114, and in such embodiments, storage controllers 114 may be configured as redundant. In addition or in the alternative, storage controllers 114 may in some embodiments be shared among two or more information handling systems 102. As also shown in FIG. 1, each storage controller 114 may be coupled to one or more storage interfaces 126 via cables 124. For example, in some embodiments, each storage controller 114 may be coupled to a single associated storage interface 126 via a cable 124. In other embodiments, each storage controller 114 may be coupled to two or more storage interfaces 126 via a plurality of cables 124, thus permitting redundancy as shown in FIG. 1. Storage controllers 114 may also have features supporting shared storage and high availability. For example, in PCIe implementations, a unique PCIe identifier may be used to indicate shared storage capability and compatibility in system 100.

As depicted in FIG. 1, a switch 110 may have coupled thereto one or more slots 120. A slot 120 may include any system, device, or apparatus configured to allow addition of one or more expansion cards to chassis 101 in order to electrically coupled such expansion cards to a switch 110. Such slots 120 may comprise any suitable combination of full-height risers, full-height slots, and low-profile slots. A full-height riser may include any system, device, or apparatus configured to allow addition of one or more expansion cards (e.g., a full-height slot) having a physical profile or form factor with dimensions that practically prevent such expansion cards to be coupled in a particular manner (e.g., perpendicularly) to mid-plane 106 and/or switch 110 (e.g., the proximity of information handling resources in chassis 101 prevents physical placement of an expansion card in such manner). Accordingly, a full-height riser may itself physically couple with a low-profile to mid-plane 106, a switch 110, or another components, and full-height cards may then be coupled to full-height slots of full-height riser. On the other hand, low-profile slots may be configured to couple low-profile expansion cards to switches 110 without the need for a full-height riser.

Slots 120 may also include electrically conductive elements (e.g., edge connectors, traces, etc.) allowing for expansion cards inserted into slots 120 to be electrically coupled to switches 110. In operation, switches 110 may manage switching of communications between individual information handling systems 102 and expansion cards coupled to slots 120. In some embodiments, slots 120 may be nonshared (e.g., each slot 120 is associated with a single information handling system 102). In other embodiments, one or more of slots 120 may be shared among two or more information handling systems 102. In these and other embodiments, one or more slots 120 may be configured to be compatible with PCIe, generalized PC bus switch, Infiniband, or other suitable communication specification, standard, or protocol.

Network interface 116 may include any suitable system, apparatus, or device operable to serve as an interface between chassis 101 and an external network (e.g., a local area network or other network). Network interface 116 may enable information handling systems 102 to communicate with the external network using any suitable transmission protocol (e.g., TCP/IP) and/or standard (e.g., IEEE 802.11, Wi-Fi). In certain embodiments, network interface 116 may include a network interface card (NIC). In the same or alternative embodiments, network interface 116 may be configured to communicate via wireless transmissions. In the same or alternative embodiments, network interface 116 may provide physical access to a networking medium and/or provide a low-level addressing system (e.g., through the use of Media Access Control addresses). In some embodiments, network interface 116 may be implemented as a local area network (LAN) on motherboard (LOM) interface.

In some embodiments, various components of chassis 101 may be coupled to a planar. For example, a planar may interconnect switches 110, chassis management controller 112, storage controllers 114, network interface 116, optical media drive 132, KVM interface 134, user interface 136, and/or other modular information handling resources of chassis 101 to mid-plane 106 of system 100. Accordingly, such planar may include slots and/or connectors configured to interconnect with such information handling resources.

Storage interfaces 126 may include any system, device, or apparatus configured to facilitate communication between storage controllers 114 and disk drives 130. For example, a storage interface may serve to permit a relatively small number of communication links (e.g., two) between storage controllers 114 and storage interfaces 126 to communicate with a greater number of disk drives 130. Thus, a storage interface 126 may provide a switching mechanism and/or disk drive addressing mechanism that allows an information handling system 102 to communicate with numerous disk drives 130 via a limited number of communication links and/or channels. Accordingly, a storage interface 126 may operate like an Ethernet hub or network switch that allows multiple systems to be coupled using a single switch port (or relatively few switch ports). A storage interface 126 may be implemented as an expander (e.g., a Serial Attached SCSI (SAS) expander), an Ethernet switch, a FibreChannel switch, Internet Small Computer System Interface (iSCSI) switch, or any other suitable switch. In order to support high availability storage, system 100 may implement a plurality of redundant storage interfaces 126, as shown in FIG. 1.

Disk drive backplane 128 may comprise any system, device, or apparatus configured to interconnect modular storage interfaces 126 with modular disk drives 130. Accordingly, disk drive backplane 128 may include slots and/or connectors configured to receive storage interfaces 126 and/or disk drives 130. In some embodiments, system 100 may include two or more backplanes, in order to support differently-sized disk drive form factors. To support redundancy and high availability, a backplane 128 may be configured to receive a plurality (e.g., 2) of storage interfaces 126 which couple two storage controllers 114 to each disk drive 130.

Each disk drive 130 may include computer-readable media (e.g., magnetic storage media, optical storage media, opto-magnetic storage media, and/or other type of rotating storage media, flash memory, and/or other type of solid state storage media) and may be generally operable to store data and/or programs (e.g., one or more operating systems and/or one or more application programs). Although disk drives 130 are depicted as being internal to chassis 101 in FIG. 1, in some embodiments, one or more disk drives may be located external to chassis 101 (e.g., in one or more enclosures external to chassis 101).

Optical media drive 132 may be coupled to mid-plane 106 and may include any suitable system, apparatus, or device configured to read data from and/or write data to an optical storage medium (e.g., a compact disc (CD), digital versatile disc (DVD), blue laser medium, and/or other optical medium). In certain embodiments, optical media drive 132 may use laser light or other electromagnetic energy to read and/or write data to an optical storage medium. In some embodiments, optical media drive 132 may be nonshared and may be user-configurable such that optical media drive 132 is associated with a single information handling system 102.

KVM interface 134 may be coupled to mid-plane 106 and may include any suitable system, apparatus, or device configured to couple to one or more of a keyboard, video display, and mouse and act as switch between multiple information handling systems 102 and the keyboard, video display, and/or mouse, thus allowing a user to interface with a plurality of information handling systems 102 via a single keyboard, video display, and/or mouse.

User interface 136 may include any system, apparatus, or device via which a user may interact with system 100 and its various information handling resources by facilitating input from a user allowing the user to manipulate system 100 and output to a user allowing system 100 to indicate effects of the user's manipulation. For example, user interface 136 may include a display suitable for creating graphic images and/or alphanumeric characters recognizable to a user, and may include, for example, a liquid crystal display (LCD), cathode ray tube (CRT), a plasma screen, and/or a digital light processor (DLP) projection monitor. In certain embodiments, such a display may be an integral part of chassis 101 and receive power from power supplies (not explicitly shown) of chassis 101, rather than being coupled to chassis 101 via a cable. In some embodiments, such display may comprise a touch screen device capable of receiving user input, wherein a touch sensor may be mechanically coupled or overlaid upon the display and may comprise any system, apparatus, or device suitable for detecting the presence and/or location of a tactile touch, including, for example, a resistive sensor, capacitive sensor, surface acoustic wave sensor, projected capacitance sensor, infrared sensor, strain gauge sensor, optical imaging sensor, dispersive signal technology sensor, and/or acoustic pulse recognition sensor. In these and other embodiments, user interface 136 may include other user interface elements (e.g., a keypad, buttons, and/or switches placed in proximity to a display) allowing a user to provide input to system 100. User interface 136 may be coupled to chassis management controllers 112 and/or other components of system 100, and thus may allow a user to configure various information handling resources of system 100 (e.g., assign individual information handling systems 102 to particular information handling resources).

When a system (e.g., system 100) is architected so as to allow information handling information handling resources (e.g., Peripheral Component Interconnect Express (PCIe) adapters coupled to slots 120) to be located in a chassis having shared resources such that the information handling resources may be assigned to one information handling system or shared among a plurality of information handling resources, challenges may arise when needing to service an information handling resource. Because such information handling resources are not located within an information handling system 102, but rather in a shared chassis using switches to route input/output (I/O) communications among selected information handling systems 102, powering of such information handling resources may not be directly controlled by an associated information handling system 102. Hence, an information handling system 102 may not be able to power down an associated information handling resource regardless of its own power state. Accordingly, when an information handling resource requires servicing in system 100, a safe method for removal of the information handling resource may be desirable. For example, it may be desirable that such a method account for power being withdrawn from the information handling resource so that it may be safely removed (e.g., from a slot 120) without damage to the information handling resource. As another example, it may be desirable to account for situations in which the information handling resource is shared among multiple information handling systems 102, as withdrawing power from the information handling resource while other information handling systems 102 are interacting with the information handling resources may cause undesirable effects (e.g., operating system crashes on an associated information handling system 102).

FIGS. 2A and 2B illustrate a flow chart of an example method 200 for facilitating safe removal of an information handling resource, in accordance with the present disclosure. According to certain embodiments, method 200 may begin at step 202. As noted above, teachings of the present disclosure may be implemented in a variety of configurations of system 100. As such, the preferred initialization point for method 200 and the order of the steps 202-228 comprising method 200 may depend on the implementation chosen.

Method 200 may begin in response to any suitable stimulus or trigger. For example, method 200 may be invoked in response to a user input received via KVM interface 134 and/or user interface 136 indicating a user desire to remove an information handling resource (e.g., an information handling resource coupled via a slot 120). In these and other embodiments, method 200 may be implemented as an interactive "wizard" that communicates information and/or queries to a user at KVM interface 134 and/or user interface 136 and/or receives information and/or responses to queries from a user at KVM interface 134 and/or user interface 136. In such embodiments, a communications channel may exist via midplane 106 between a chassis management controller 112 and one or more of KVM interface 134 and user interface 136 for facilitating communication of such interactive wizard.

At step 202, resource removal module 152 and/or another component of system 100 may determine whether the information handling resource to be removed is shared among a plurality of information handling systems 102 or is associated with a single information handling system 102. Such determination may be made by reference to a table, map, database, and/or other suitable data structure accessible to resource removal module 152 (e.g., stored on a computer-readable medium present within a chassis management controller 112 or elsewhere in system 100). If the information handling resource to be removed is shared among a plurality of information handling systems 102, method 200 may proceed to step 206. Otherwise, if the information handling resource to be removed is associated with a single information handling system 102, method 200 may proceed to step 204.

At step 204, in response to a determination that the information handling resource to be removed is associated with a single information handling system 102, resource removal module 152 and/or another component of system 100 may determine if the single information handling system 102 is still powered on. If the single information handling system 102 is not powered on, method 200 may proceed to step 224. Otherwise, if the single information handling system 102 is powered on, method 200 may proceed to step 212.

At step 206, in response to a determination that the information handling resource to be removed is shared among a plurality of information handling systems 102, resource removal module 152 and/or another component of system 100 may determine if any of the shared information handling systems 102 is still powered on. If all shared information handling systems 102 are not powered on, method 200 may proceed to step 224. Otherwise, if one or more of the shared information handling systems are powered on, method 200 may proceed to step 208.

At step 208, resource removal module 152 and/or another component of system 100 may query a user (e.g., via KVM interface and/or user interface 136) whether the user desires to power down the information handling resource to be removed while leaving information handling systems 102 associated with the information handling resource powered on, and may receive a response to such query from the user. If the response to the query indicates a user desire to power down the information handling resource while leaving associated information handling systems 102 powered on, method 200 may proceed to step 214. Otherwise, if the response to the query indicates a user desire to power down the information handling resource while powering off associated information handling systems 102, method 200 may proceed to step 210.

At step 210, resource removal module 152 and/or another component of system 100 may query a user (e.g., via KVM interface and/or user interface 136) whether the user desires to presently power down the information handling systems 102 associated with the information handling resource to be removed, and may receive a response to such query from the user. If the response to the query indicates a user desire to presently power down the associated information handling systems 102, method 200 may proceed to step 212. Otherwise, if the response to the query indicates a user desire to not presently power down the associated information handling systems 102, method 200 may proceed to step 222.

At step 212, resource removal module 152 and/or another component of system 100 may instruct information handling systems 102 (whether a single information handling system 102 or a plurality of shared information handling systems 102) associated with the information handling resource to be removed to power down. For example, resource removal module 152 and/or another component of system 100 may cause a chassis management controller 112 to communicate a command to associated information handling system 102 to power down (e.g., a DELL original equipment manufacturer system management command). After completion of step 212, method 200 may proceed to step 224.

At step 214, in response to a determination that a query response indicates a user desire to power down the information handling resource while leaving associated information handling systems 102 powered on, resource removal module 152 and/or another component of system 100 may query the user (e.g., via KVM interface and/or user interface 136) whether the user desires to remove information handling resource associations with information handling systems 102. Removal of such associations (e.g., de-associating information handling systems 102 with the information handling resource to be removed) prior to physical removal of an information handling resource may prevent undesirable operation of information handling systems 102 (e.g., operating system stalls and/or crashes). If the response to the query indicates a user desire to remove information handling resource associations with information handling systems 102, method 200 may proceed to step 216. Otherwise, if the response to the query indicates a user desire to not remove information handling resource associations with information handling systems 102, method 200 may proceed to step 220.

At step 216, in response to a determination that a response to a user query indicates a user desire to remove information handling resource associations with information handling systems 102, resource removal module 152 and/or another component of system 100 may store configuration information associated with the information handling resource, such that the configuration information may be applied when the information handling resource is replaced. Such configuration information may be stored in any suitable manner (e.g., stored on a computer-readable medium present within a chassis management controller 112 or elsewhere in system 100). In addition or alternatively, resource removal module 152 and/or another component of system 100 may cause removal (e.g., de-association) of associations between the information handling resource and its associated information handling systems 102, which may cause hot plug events to be communicated to the associated information handling systems 102.

At step 218, resource removal module 152 and/or another component of system 100 may communicate to the user (e.g., via KVM interface and/or user interface 136) a message to ensure that the associated information handling systems have received the hot plug event.

At step 220, in response to a user query response indicating a user desire to not remove information handling resource associations with information handling systems 102, resource removal module 152 and/or another component of system 100 may communicate a warning regarding risks associated with removal of the information handling resource without first powering down associated information handling systems or removing associations between the information handling resource and the information handling systems 102 and query the user (e.g., via KVM interface and/or user interface 136) whether the user desires to proceed with removal of the information handling resource. If the response to the query indicates a user desire to proceed with removal despite the warning, method 200 may proceed to step 224. Otherwise, if the response to the query indicates a user desire to not proceed with removal of the information handling resource, method 200 may proceed to step 222.

At step 222, resource removal module 152 and/or another component of system 100 may communicate to the user (e.g., via KVM interface and/or user interface 136) a message indicating that the resource removal module 152 will exit and that it may be accessed again at a later time. After completion of step 222, method 200 may end.

At step 224, resource removal module 152 and/or another component of system 100 may power down the information handling resource to be removed. For example, resource removal module 152 and/or another component of chassis controller 112 may instruct a slot management controller (e.g., information handling resource hotplug controller and/or PCIe slot management controller) associated with the information handling resource to power off the information handling resource.

At step 226, the information handling resource to be removed and/or a slot 120 to which it is coupled may provide a physical indication (e.g., via illuminated light emitting diode on the information handling resource and/or slot 120) of the location of the information handling system, thus providing assurance that the user will remove the correct information handling resource from chassis 101.

At step 228, resource removal module 152 and/or another component of system 100 may communicate to the user (e.g., via KVM interface and/or user interface 136) a message indicating that it is safe to physically remove the information handling resource from chassis 101. After completion of step 228, method 200 may end.

Although FIGS. 2A and 2B disclose a particular number of steps to be taken with respect to method 200, method 200 may be executed with greater or lesser steps than those depicted in FIGS. 2A and 2B. In addition, although FIGS. 2A and 2B disclose a certain order of steps to be taken with respect to method 200, the steps comprising method 200 may be completed in any suitable order.

Method 200 may be implemented using system 100, components thereof (e.g., resource removal module 152) or any other system operable to implement method 200. In certain embodiments, method 200 may be implemented partially or fully in software and/or firmware embodied in computer-readable media.

Although the present disclosure has been described in detail, it should be understood that various changes, substitutions, and alterations can be made hereto without departing from the spirit and the scope of the disclosure as defined by the appended claims.

What is claimed is:

1. A system comprising:
   a chassis configured to receive a plurality of modular information handling systems and a plurality of modular information handling resources;
   one or more chassis management controllers housed in the chassis and configured to:
      receive a user indication of a user desire to physically remove a modular information handling resource from the chassis;
      determine whether the modular information handling resource is shared or nonshared with respect to modular information handling systems present in the chassis;
      determine whether the modular information handling systems present in the chassis and associated with the modular information handling resource are powered on;
      receive at least one response to one query to the user regarding at least one user preference regarding removal of the modular information handling resource; and
      determine if the information handling resource may be safely removed from the chassis based at least on: (i) the determination of whether the information handling system resource is shared or nonshared, (ii) the determination of whether the modular information handling systems present in the chassis and associated with the modular information handling resource are powered on, and (iii) the at least one response.

2. A system according to claim 1, the at least one response indicative of at least one of:
   a user desire regarding whether to power down modular information handling systems present in the chassis and associated with the modular information handling resource; and
   a user desire regarding whether to remove associations between the modular information handling resource and the modular information handling systems present in the chassis and associated with the modular information handling resource.

3. A system according to claim 1, the one or more chassis management controllers configured to store configuration information regarding the modular information handling resource prior to removal.

4. A system according to claim 1, the one or more chassis management controllers further configured to communicate a hot plug event to modular information handling systems present in the chassis and associated with the modular information handling resource in response to an indication of a user desire to remove associations between the modular information handling resource and the modular information handling systems.

5. A system according to claim 4, the one or more chassis management controllers further configured to communicate a message to the user to ensure that the modular information handling systems received the hot plug event.

6. A system according to claim 1, the one or more chassis management controllers further configured to power down the information handling resource in response to Determining that the information handling resource may be safely removed from the chassis.

7. A system according to claim 1, the modular information handling resource configured to generate a physical indication of the physical location of the information handling resource to be removed in response to a determination by the one or more chassis management controllers that the information handling resource may be safely removed from the chassis.

8. A system according to claim 1, further comprising a plurality of slots, each slot for coupling a respective modular information handling resource to the chassis and configured to generate a physical location of the information handling resource to be removed in response to a determination by the one or more chassis management controllers that the information handling resource may be safely removed from the chassis.

9. A system according to claim 1, the one or more chassis management controllers further configured to communicate a message to the user that it is safe to physically remove the information handling resource in response to determining that the information handling resource may be safely removed from the chassis.

10. A system according to claim 1, the user indication and the at least one response received from at least one of:
    a keyboard-video-mouse interface; and
    a user interface.

11. A method comprising:
    receiving a user indication of a user desire to physically remove a modular information handling resource from a chassis configured to receive a plurality of modular information handling systems and a plurality of modular information handling resources;
    determining whether the modular information handling resource is shared or nonshared with respect to modular information handling systems present in the chassis;
    determining whether the modular information handling systems present in the chassis and associated with the modular information handling resource are powered on;
    receiving at least one response to one query to the user regarding at least one user preference regarding removal of the modular information handling resource; and
    determining if the information handling resource may be safely removed from the chassis based at least on: (i) the determination of whether the information handling system resource is shared or nonshared, (ii) the determination of whether the modular information handling systems present in the chassis and associated with the modular information handling resource are powered on, and (iii) the at least one response.

12. A method according to claim 11, the at least one response indicative of at least one of:
    a user desire regarding whether to power down modular information handling systems present in the chassis and associated with the modular information handling resource; and
    a user desire regarding whether to remove associations between the modular information handling resource and the modular information handling systems present in the chassis and associated with the modular information handling resource.

13. A method according to claim 11, further comprising storing configuration information regarding the modular information handling resource prior to removal.

14. A method according to claim 11, further comprising communicating a hot plug event to modular information handling systems present in the chassis and associated with the modular information handling resource in response to an indication of a user desire to remove associations between the modular information handling resource and the modular information handling systems.

15. A method according to claim 14, further comprising communicating a message to the user to ensure that the modular information handling systems received the hot plug event.

16. A method according to claim 11, further comprising powering down the information handling resource in response to determining that the information handling resource may be safely removed from the chassis.

17. A method according to claim 11, generating a physical indication of the physical location of the information handling resource to be removed in response to a determination that the information handling resource may be safely removed from the chassis.

18. A method according to claim 17, wherein the physical indication is generated by at least one of modular information handling resource to be removed and a slot coupling the information handling resource to the chassis.

19. A method according to claim 11, further comprising communicating a message to the user that it is safe to physically remove the information handling resource in response to determining that the information handling resource may be safely removed from the chassis.

20. A method according to claim 11, the user indication and the at least one response received from at least one of:
    a keyboard-video-mouse interface; and
    a user interface.

* * * * *